United States Patent [19]
Ronci

[11] Patent Number: 5,476,302
[45] Date of Patent: Dec. 19, 1995

[54] RAIN COVER FOR CAR DOOR

[76] Inventor: Michael B. Ronci, 6317 N. London Ave. Apt. J, Kansas City, Mo. 64151

[21] Appl. No.: 328,358

[22] Filed: Oct. 25, 1994

[51] Int. Cl.$^6$ .................................................. B62D 25/06
[52] U.S. Cl. ............................. 296/99.1; 296/152
[58] Field of Search .................... 296/152, 99.1, 296/146.1

[56] References Cited

U.S. PATENT DOCUMENTS

| | | | |
|---|---|---|---|
| 1,425,954 | 8/1922 | Fischer | 296/99.1 |
| 1,704,994 | 3/1929 | Shallenberger | 296/152 |
| 2,532,989 | 12/1950 | Biondi | 296/99.1 X |
| 2,549,662 | 4/1951 | Carpenter | 296/95.1 |
| 2,657,089 | 10/1953 | Kaul | 296/95.1 |
| 2,873,139 | 2/1959 | Borders, Jr. et al. | 296/95.1 |
| 5,230,545 | 7/1993 | Huang et al. | 296/95.1 |

FOREIGN PATENT DOCUMENTS

| | | | |
|---|---|---|---|
| 194622 | 11/1983 | Japan | 296/99.1 |
| 194626 | 11/1983 | Japan | 296/99.1 |
| 53227 | 3/1984 | Japan | 296/99.1 |
| 63-20216 | 1/1988 | Japan | 296/99.1 |
| 207720 | 8/1988 | Japan | 296/99.1 |

*Primary Examiner*—Joseph D. Pape
*Attorney, Agent, or Firm*—Joseph H. McGlynn

[57] ABSTRACT

A rain and sun cover for an automobile that is attached at one end to a roller, and at the other end to the car door. When the door is opened the cover will unroll and provide a sheltered area so a person may close an umbrella and enter the car without getting wet.

5 Claims, 1 Drawing Sheet

5,476,302

RAIN COVER FOR CAR DOOR

BACKGROUND OF THE INVENTION

This invention relates in general to sun and rain covers and in particular to sun and rain covers for automobiles.

DESCRIPTION OF THE PRIOR ART

In the prior art covers for parked cars are known which shield the car from sunlight or rainwater, such as U.S. Pat. No. 5,230,545 to Huang et al. However, the prior art devices are inconvenient to operate and unsightly in appearance.

SUMMARY OF THE INVENTION

This invention is directed to a simple to operate cover for an automobile doorway. The cover is convenient and does not present an unsightly appearance. It can be used on sunny days to provide shade for a parked car and on rainy days can provide a protected entry so the driver or passengers will have a dry area to close umbrellas or the like as they enter or exit the automobile.

Entering and exiting an automobile during a rainstorm poses unique obstacles to keeping dry during the entrance or exit. While an umbrella provides adequate protection during the approach to the vehicle, and even while unlocking and opening the vehicle door, a person encounters difficulty actually entering the vehicle and staying dry at the same time. A person must, by necessity stay outside the vehicle in order to close the umbrella. As a result there is a brief period in which a person, as well as the interior of the automobile, is exposed to rain.

The present invention is designed to overcome this problem. It consists of a water resistant umbrella-like fabric that stretches across the gap between an open car door and the car door frame. The fabric provides protection from the rain for a person trying to close an umbrella and enter the car.

The umbrella-like fabric is attached, on one end, to a roller, similar to a window shade roller which is attached to the interior of the automobile. The other end of the fabric (the free end) is detachably mounted to attachment points at the top of the door. When the door is opened the fabric will be deployed automatically. When the door is closed, the fabric will be rolled unto the roller.

When the free end of the fabric is not attached to the attachment points at the top of the door, the fabric will remain wound on the roller, similar to the way a window shade stays wound on its roller when it has not been pulled down. When the free end of the fabric is not attached to the attachment points at the top of the door, opening and closing the door will have no effect on the fabric or the roller. If the free end of the fabric is attached to the attachment points at the top of the door, opening the door will cause the fabric to deploy automatically, with the opening door providing the required tension to unroll the fabric from the roller. Additionally, closing the door, with the free end attached, will cause the fabric to roll back onto the roller These and other objects and advantages of the present invention will be fully apparent from the following description, when taken in connection with the annexed drawings.

DESCRIPTION OF THE PREFERRED EMBODIMENT

Figure 1:
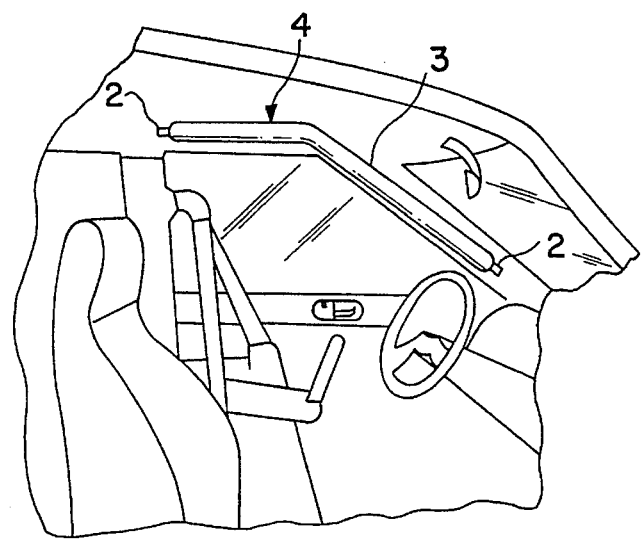
FIG. 1 is a view from the interior of the automobile.

The sun and rain cover 1 is shown in FIG. 1 as seen from the interior of the automobile. A roller 3 is attached along the interior of the roof of the automobile. Brackets (not shown) which are similar to the brackets used on window shades, can be used to secure the roller. However, the specific brackets used are not part of the invention. Any securing means that will attach the roller to the interior of the car can be used. By attaching the roller along the roof line, the roller is mounted out of the way of a person entering or exiting the car. Also, it is out of the way when not in use. However, it should be understood that the mounting location is not critical to the operation of the sun and rain cover. Any location can be selected that will allow the cover to roll and unroll.

Figure 2:
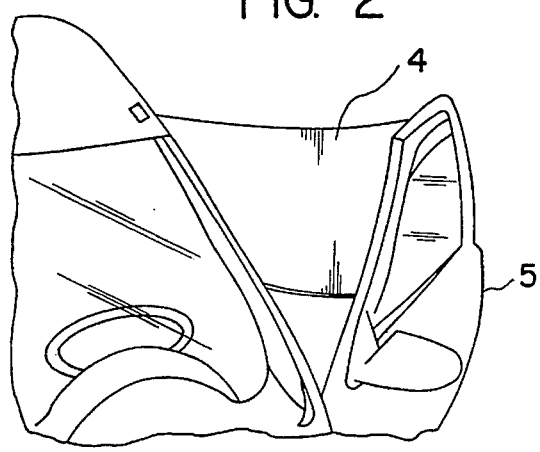
FIG. 2 is an exterior view seen from the front of the automobile.
Figure 3:
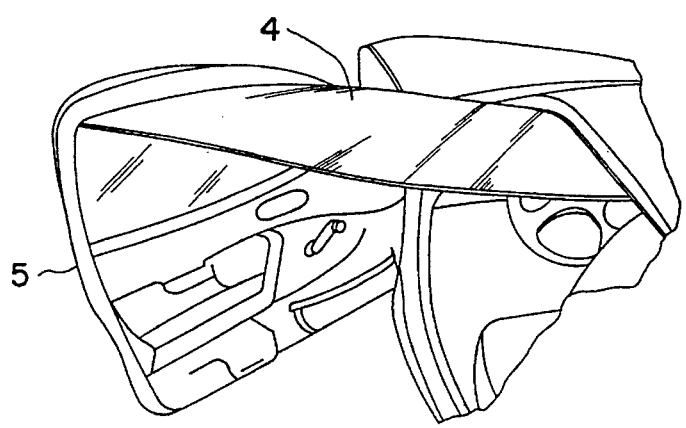
FIG. 3 is an exterior view seen from the back of the automobile.

A vinyl or plastic fabric 4 (see FIGS. 2 and 3) is attached at one end to the roller 3. The material of the fabric is not critical. Any material that is waterproof can be used, although vinyl or plastic will last longer than a material such as waxed paper. The end of the fabric that is not attached to the roller (the free end) has clips 6 attached to the free end of the fabric such as by rivets. The Other end of the clips 6 will have a hooked end that can be placed over the top of the window or attached to the door trim inside the automobile. This can be easily done by a person before they exit the car, so the cover will be in position to operate when they return to the car.

Other means for attaching the free end of the fabric to the car door may be used. For example magnets or suction cups may also be used.

Upon returning to the car during a rain storm, a person merely has to open the door in the normal manner, and the cover will automatically unroll thereby providing protection for the interior of the automobile. Also, it will provide protection for the person while they close their umbrella. When they are inside the car, with the door closed, they can unclip the free end of the fabric, which will be stored on the roller, ready to be used when needed again.

The exact position of the fabric with respect to the door is not critical, as long as it provides enough cover to provide protection for the interior of the car and a person attempting to enter the car. For example, the fabric could cover all or a substantial part of the top of the door. It could also be formed so it extends part way, or all the way down the front, slanted part of the door.

Also the roller could be mounted in a shield having an opening to allow the fabric to unroll. The shield would not interfere with the normal operation of the roller, and would catch water, that remains on the roller when the door is closed, and prevent water from dripping onto the interior of the car or the people in the car.

Although the rain and sun cover and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A cover for an automobile comprising, a roller assembly attached inside said automobile near the roof of said automobile, fabric attached at one end to said roller assembly, said fabric having attachment means at the other end for attaching said fabric to the door of said automobile, said fabric being approximately as wide as the top of said door, whereby when said door is opened said fabric will unroll from said roller assembly and cover the area between said automobile door and the interior of said automobile.

2. The cover as claimed in claim 1, wherein said fabric is made from a waterproof material.

3. The cover for an automobile as claimed in claim 1, wherein said cover comprises a first and a second section, said first section extending parallel with a top of said door, and said second section extending at an angle from said first section, whereby said first section will protect said interior of said automobile from rain falling from overhead and said second section will protect said interior of said automobile from rain blowing into said interior of said automobile.

4. A cover for an automobile having a roof, sides attached to said roof, door openings in said sides, doors mounted adjacent said door openings, and a material covering the inside of said roof, said cover comprising, a roller assembly attached wholly inside said automobile near the roof of said automobile and beneath said material covering the inside of said roof, fabric attached at one end to said roller assembly, said fabric having attachment means at the other end for attaching said fabric to said doors of said automobile, said fabric being approximately as wide as the top of said doors, whereby when one of said doors is opened said fabric will unroll from said roller assembly and cover the area between said door and the interior of said automobile.

5. The cover for an automobile as claimed in claim 4, wherein said cover comprises a first and a second section, said first section extending parallel with a top of said door, and said second section extending at an angle from said first section, whereby said first section will protect said interior of said automobile from rain falling from overhead and said second section will protect said interior of said automobile from rain blowing into said interior of said automobile.

* * * * *